(12) United States Patent
Becker et al.

(10) Patent No.: US 6,921,058 B2
(45) Date of Patent: Jul. 26, 2005

(54) SEAT FRAME OF A MOTOR VEHICLE SEAT WITH A SEAT CARRIER AND A PADDING SUPPORT

(75) Inventors: Burckhard Becker, Solingen (DE); Wilfried Beneker, Leichlingen (DE)

(73) Assignee: C. Rob Hammerstein GmbH & Co. KG (DE)

( * ) Notice: Subject to any disclaimer, the term of this patent is extended or adjusted under 35 U.S.C. 154(b) by 37 days.

(21) Appl. No.: 10/442,419

(22) Filed: May 21, 2003

(65) Prior Publication Data

US 2003/0230695 A1 Dec. 18, 2003

(30) Foreign Application Priority Data

Jun. 14, 2002 (DE) .......................................... 102 26 717

(51) Int. Cl.[7] .............................................. F16M 11/00
(52) U.S. Cl. ...................... 248/419; 248/370; 248/371; 248/421; 297/344.17; 297/325
(58) Field of Search ................................. 248/397, 419, 248/398, 370, 424, 371, 421, 422; 297/344.17, 325, 328, 330

(56) References Cited

U.S. PATENT DOCUMENTS

| | | | | |
|---|---|---|---|---|
| 2,101,350 A | * | 12/1937 | Simpson et al. ............ | 248/419 |
| 4,128,225 A | * | 12/1978 | Kluting et al. ............... | 248/421 |
| 4,787,594 A | * | 11/1988 | Ikegaya et al. .............. | 248/421 |
| 5,007,611 A | * | 4/1991 | Kanai .......................... | 248/422 |
| 6,264,275 B1 | * | 7/2001 | Frohnhaus et al. ..... | 297/344.12 |
| 6,484,995 B1 | * | 11/2002 | Nemoto ...................... | 248/421 |
| 6,488,337 B1 | * | 12/2002 | De Voss et al. ......... | 297/344.13 |

FOREIGN PATENT DOCUMENTS

DE 44 37 539 C2 4/1995

* cited by examiner

*Primary Examiner*—Kimberly Wood
(74) *Attorney, Agent, or Firm*—Akerman Senterfitt

(57) ABSTRACT

A frame of a motor vehicle seat with a longitudinal guide (20), a seat carrier (26), a front pair of oscillating cranks disposed between the longitudinal guide (20) and the seat carrier (26), and a padding support for a seat padding. A pinion (48) is rotatably disposed on one of the oscillating cranks (22, 23), an actuator (71) being associated with the pinion. A pivot unit (54) is disposed between the two oscillating cranks (22, 23) and is rotationally linked to the two oscillating cranks (22, 23) so as to be pivotal about an axial line. The pivot unit (54) is provided with a sector gear (62) that is centered on the axial line and meshes with the pinion (48), and an adjusting arm (64) is provided which is disposed between the pivot unit (54) and the padding support (30) so that the height of a front edge of the padding support (30) is adjustable by adjusting the sector gear (62).

13 Claims, 5 Drawing Sheets

SEAT FRAME OF A MOTOR VEHICLE SEAT WITH A SEAT CARRIER AND A PADDING SUPPORT

BACKGROUND OF THE INVENTION

The invention relates to a frame of a motor vehicle seat with a longitudinal guide, a seat carrier, a front pair of oscillating cranks disposed between the longitudinal guide and the seat carrier and a padding support for a seat padding.

Motor vehicle seats with the possibility of adjusting the seat pan both in the longitudinal direction and with respect to the vertical adjustment of the front edge of the seat are well known, the reader is referred, by way of example only, to DE 44 37 539. The adjustment possibilities are also termed seat depth adjustment and reclining adjustment.

Vehicle seats are adjustable in a plurality of ways, which applies more specifically for the vehicle seats in a motor vehicle of a high standard. Accordingly, the motor vehicle seat of the type mentioned herein above, and preferably the inventive motor vehicle seat as well, are additionally equipped with an adjustment of the seat pan height, further adjustment possibilities for a seat back and so on being also provided for. The plurality of adjustment possibilities also involves a more complicated construction with a plurality of adjusting and locking devices and of corresponding operating members. In an effort to keep manufacturing, weight and maintenance within reasonable limits and to simplify operation, one aims at making the discrete adjusting devices as compact and functional as possible and with the fewest possible component parts while additionally disposing them in regions of the seat frame which provide convenient space for this purpose.

SUMMARY OF THE INVENTION

This is where the invention comes to bear. It is an object thereof to develop the frame of a motor vehicle seat of the type mentioned herein above in such a manner that a reclining adjustment device comprised of few parts can be conveniently disposed and housed in the front region of the seat frame and is well suited for being combined with a seat depth adjustment device.

In view of the motor vehicle seat frame of the type mentioned herein above, the solution to this object is achieved in that a pinion is rotatably disposed on one of the oscillating cranks of the pair of oscillating cranks, an actuator being associated with said pinion, that there is provided a pivot unit which is disposed between the two oscillating cranks and is rotationally linked to said oscillating cranks so as to be pivotal about an axial line, that this pivot unit is provided with a sector gear that is centered on the axial line and meshes with the pinion and that there is provided an adjusting arm which is disposed between the pivot unit and the padding support so that the height of a front edge of the padding support is adjustable by adjusting the sector gear.

In this reclining adjustment device, component parts that are required anyway are provided to a considerable extent with an additional function so that but a small number of additional component parts are needed. Accordingly, one of the two front oscillating cranks of the pair of oscillating cranks is used for disposing, preferably for mounting, the pinion on bearings, it can in the same way also carry the actuator of the pinion, more specifically an electric motor. A tie-bar, which is provided anyway between the two oscillating cranks of the front pair of oscillating cranks, is now implemented as a pivot unit. Although it is still mechanically connected to the oscillating cranks of the front pair of oscillating cranks, the connection is no longer a rigid connection but a pivotal one. It is preferably mounted in the two arms or on a rod-shaped connecting part of the pivot unit. The sector gear is part of the pivot unit, it is rigidly connected to the rod-shaped connecting part. The padding support is raised and lowered in the region of the front edge thereof through the at least one adjusting arm. Preferably, two adjusting arms are provided in the immediate proximity to the oscillating cranks. It is thereby possible to provide for a sector gear on either side of the seat, but the locking and the drive operations preferably only occur on one seat side, a driver arm being provided instead of the sector gear on the other side of the seat, said driver arm being hinge-linked to said adjusting arm. The rod-shaped connecting part of the pivot unit thereby transfers the adjustment forces.

Accordingly, this frame can be given a compact structure with a small number of additional component parts being required over a motor vehicle seat with parallelogram movement. The actuation drive, which is preferably implemented as an electric motor, may conveniently be disposed underneath the pivot unit, more specifically underneath the rod-shaped connecting part. Said rod-shaped connecting part may additionally be cranked to provide space for the motor.

The invention altogether permits to achieve a compact, discrete constructional unit which consists of a pair of oscillating cranks, a pivot unit and a drive and which is easy to pre-assemble and to integrate in a seat frame.

In a preferred development, the axial line about which the pivot unit is pivotable is located substantially between the upper and the lower joint of the pair of oscillating cranks, although it is located slightly nearer to the upper joint. As a result thereof, a compact and space saving arrangement of the reclining adjustment device is achieved on the one side while on the other side providing for convenient movement.

In a further improvement it is suggested to offset toward the front edge of the padding support the axial line relative to a line joining the lower joint and the upper joint. This provision also provides space for the actuator while increasing road clearance and achieving convenient movement.

In a further improvement, the pivot unit has a rod-shaped connecting part and this rod-shaped connecting part is offset in a parallel orientation in its center region, meaning it is cranked. In this way, more space is provided for disposing the actuator and road clearance is increased as well. The movement is also improved. Altogether, one takes advantage of the fact that the entire pivot angle of the pivot unit is quite small and ranges for example from 15 to 45 degrees. This small pivot angle permits to dispose the rod-shaped connecting part at a site where it disturbs least.

In a particularly preferred development it is suggested that a driver be disposed on the padding in proximity to the front edge thereof and that a linear actuator be provided between the rod-shaped connecting part of the pivot unit and the driver, the padding support being displaced relative to the seat carrier upon actuation of said linear actuator. In combination with the features recited in the preamble of claim 1, this feature is considered inventive by itself, meaning without the special characteristics of the reclining adjustment as they have been described herein above. The thus achieved seat depth adjustment is achieved using quite simple means. A linear actuator can be manufactured and housed conveniently with respect to space, costs and weight. It is preferably implemented as a spindle actuator. An associated driving means, more specifically an electric motor, can be disposed in immediate proximity to the actuator for the reclining adjustment so that the two drives can be arranged in a compact and blockwise manner.

In a development, the actuator is disposed approximately in the center between the two front oscillating cranks. This permits special adjusting means on either seat side to be dispensed with, the entire adjustment apparatus for the seat depth rather being of small dimensions, disposed underneath the seat center and requiring an extremely small number of additional component parts as compared to a seat frame without such an actuator.

The adjusting devices described are located in the front region of the seat frame, more specifically in the front half underneath a seat carrier or a padding support. In the rear region, seat carrier and padding support are joined together in such a manner that they are longitudinally slidable relative to each other and moreover pivotable. Appropriate means that are known in the art can be utilized for this purpose. A longitudinal guide that can be pivoted and that has been disclosed in the German Patent mentioned herein above can be used. A guide means is proposed which is disposed in the rear region and which allows the padding support to be displaced in the longitudinal direction relative to the seat carrier and substantially parallel to the longitudinal guide and, in addition thereto, a rear pivot line oriented parallel to the axial line and, as a result thereof, a pivotal connection between the padding support and the seat carrier. Such type guide means can be disposed at a convenient location on either seat side. The padding support has rolls rolling in an elongated slot of the seat carrier or on two parallel, elongated flanges connected to the seat carrier for example.

BRIEF DESCRIPTION OF THE DRAWINGS

Further advantages and characteristics of the invention will become apparent from the remaining claims and from the following, non restrictive description of an embodiment thereof, given by way of example only with reference to the drawing in which:

DETAILED DESCRIPTION OF THE INVENTION

Figure 1:
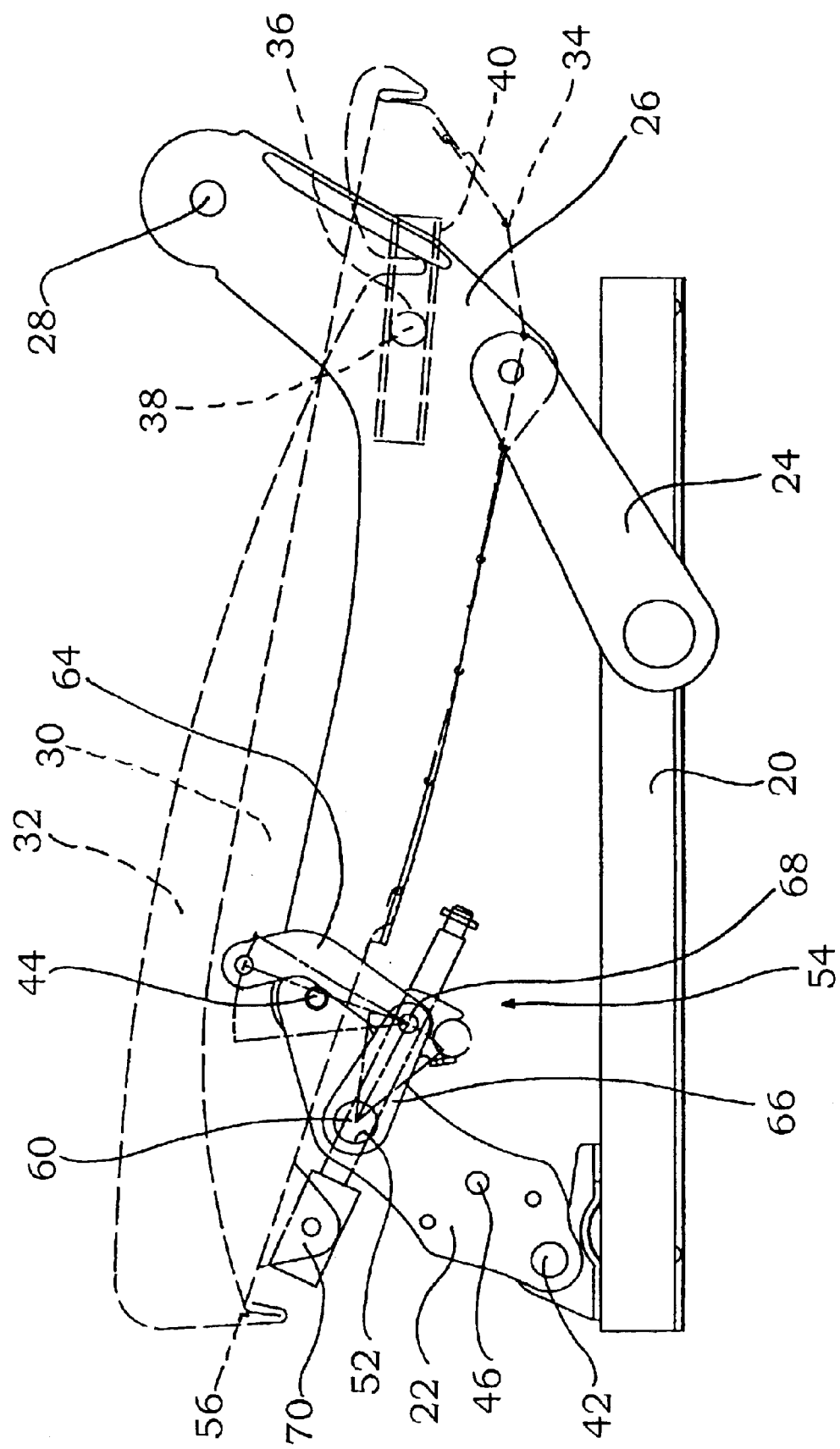
FIG. 1 is a side view of a frame for a motor vehicle seat with a longitudinal guide without back rest frame and FIG. 2 is a perspective illustration in the form of an assembly drawing showing an oblique view from the top front of the important parts of the seat depth adjustment and of the reclining adjustment, the longitudinal guide, the seat carrier and the padding support having been omitted for simplification sake.

In an actually known manner, the frame of the motor vehicle seat has a longitudinal guide 20, with two oscillating cranks 22, 23 of a front pair of oscillating cranks being articulated on, and protruding upward away from, said guide in the front region thereof and with two pivotal supports 24 being hinge-linked in the rear region thereof. These pivotal parts 22–24 carry a seat carrier 26 and permit height adjustment of said seat carrier 26 relative to the longitudinal guide. A four-bar linkage is formed, one speaks of the parallelogram movement of the linkage. An adjusting device for locking the four-bar linkage (not shown) is provided for. It may for example be mounted in the region of an upper hinge point of a rear pivotal support. Such type devices are well known in the art and need not be shown or explained in closer detail herein.

The seat carrier substantially consists of two side parts which are located more or less above the longitudinal guide 20. Each side part has, in the rear region thereof, an upward projecting portion extending as a continuation and provided with a receiving hole 28 for a back rest. The latter is not shown in closer detail herein as it is well known in the art.

A padding support 30 is moreover provided, in the concrete exemplary embodiment it is located between the two side parts that form the seat carrier 26. The function of the padding support 30 is to carry a padding 32 for the seat pan and to receive an associated suspension 34. These parts are shown by way of example only and are therefore illustrated in dashed lines, the seat way for example also be implemented as a bucket seal.

In the rear region, the padding support 30 and the seat carrier 26 are joined together so as to be longitudinally slidable on the one side and pivotal to a small angle on the other side. A guide means 36, which is formed on either side of the seat, is provided for this purpose. Axle journals, or preferably rolls 38, project from the padding 32 across the longitudinal direction of the seat, said rolls fittingly sliding between the two projecting flanges of the seat carrier 26. A longitudinal displacement is thus obtained, which is substantially parallel to the direction of the longitudinal guide 20. A pivoting possibility is concurrently achieved. The length of the longitudinal guide substantially corresponds to the length of the adjustment path of the seat depth adjustment. The pivot angle is adapted to the desired adjustment range of the reclining adjustment.

The two oscillating cranks 22, 23 are built according to the same principle. They are respectively hinged in a lower joint 42 to the associated seat rail of the respective one of the pairs of rails of the longitudinal guide 20, a special bearing block is provided for this purpose as can be seen from FIG. 1. In the upper region they are hinge-linked in an upper joint 44 to the seat carrier 26. In the middle position of the seat, a connection line passes between these two joints 42, 44, approximately at an angle of 40 degrees relative to the longitudinal direction of the longitudinal guide 20, the oscillating cranks 22, 23 are inclined backward as can be seen from FIG. 1.

The oscillating cranks 22, 23 are flat sheet metal parts, they are no longer designed in the form of elongated elements in a way similar to the pivotal supports 24 like in prior art but have a certain width and a somewhat irregular shape.

Figure 2:
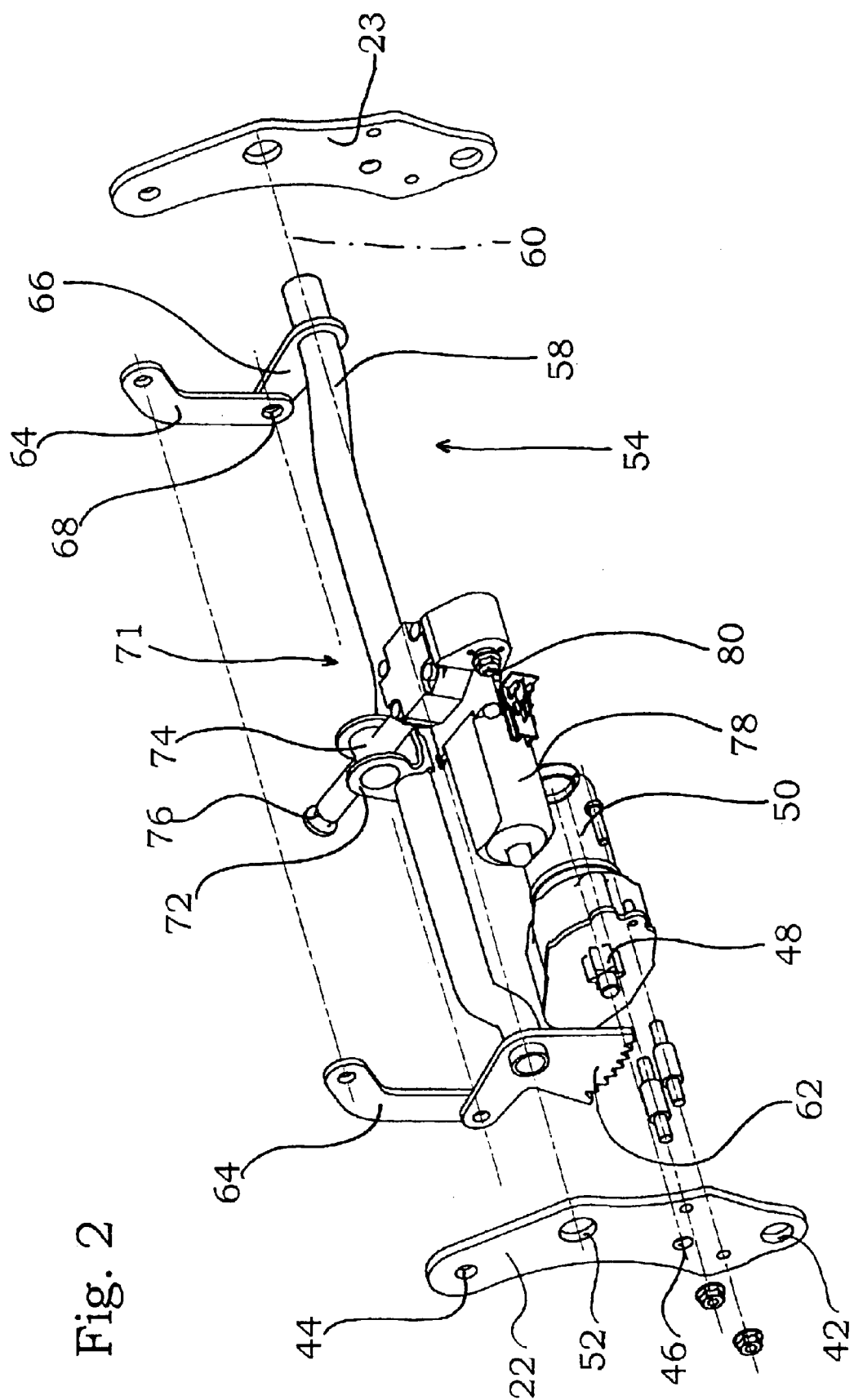
Figure 3:
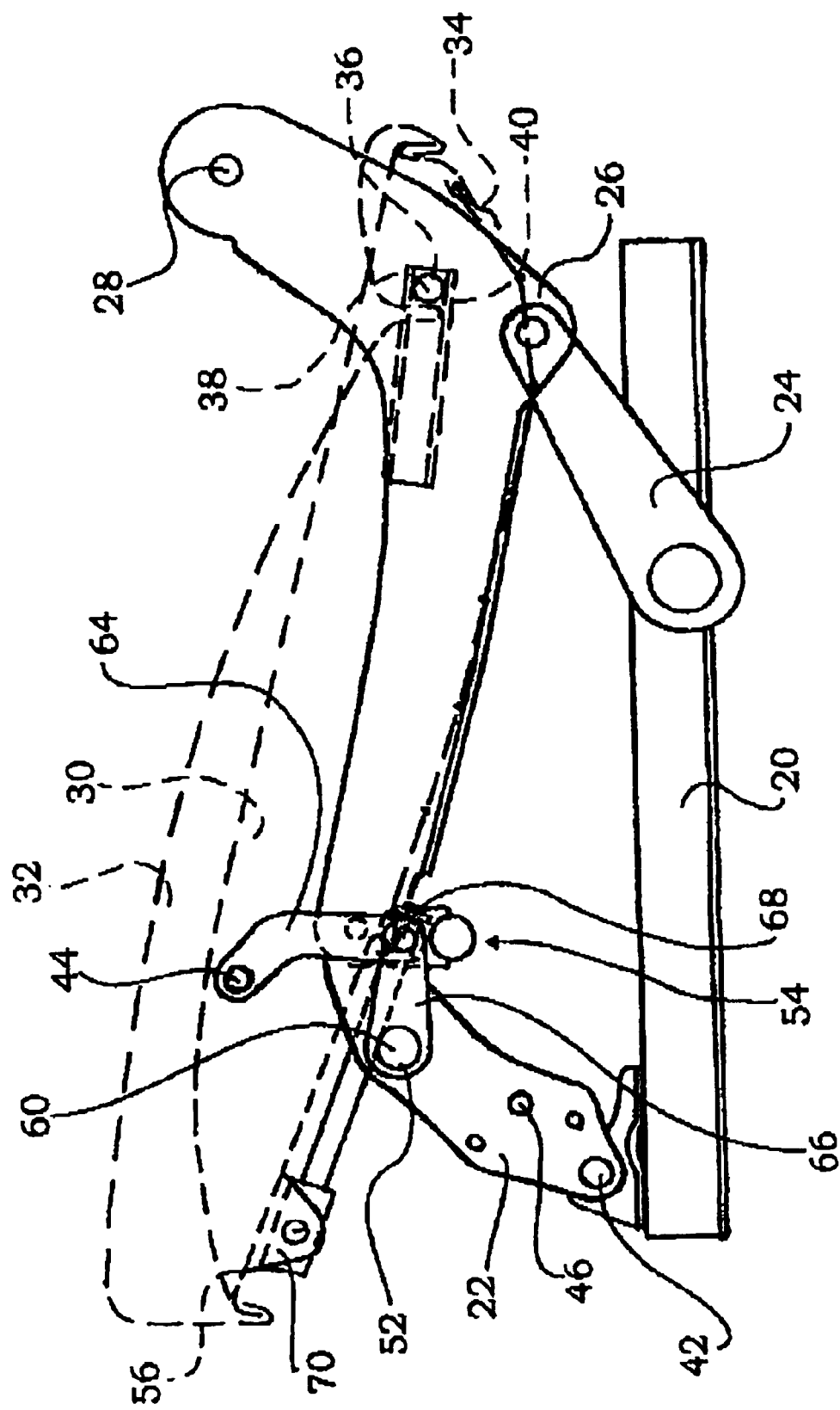
FIG. 3 is a side view of the frame of FIG. 1 showing the driver arm 66 in its topmost position and the adjusting arm 64 in its most forward position.
Figure 4:
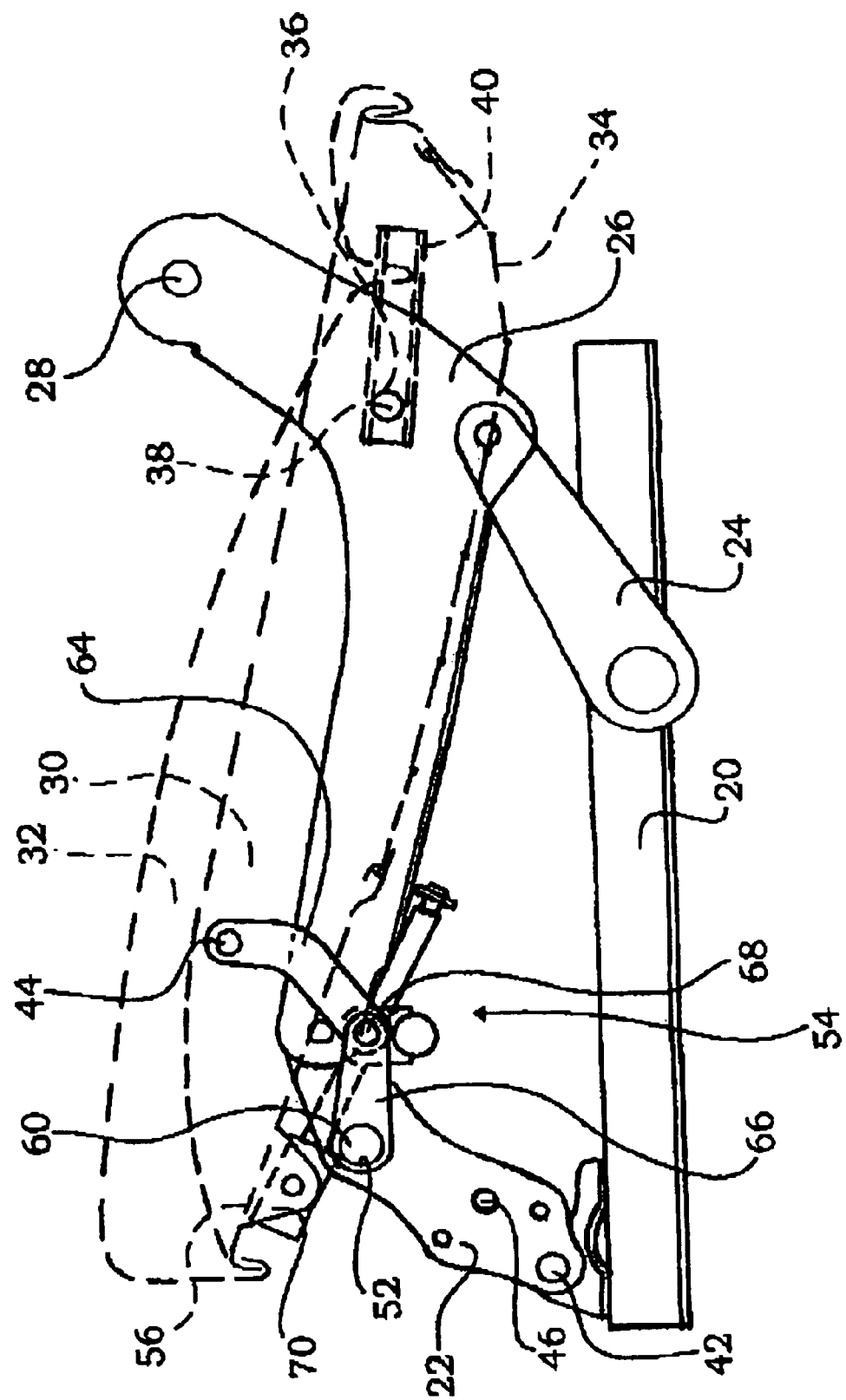
FIG. 4 is a side view of the frame of FIG. 1 showing the driver arm 66 in its topmost position and the adjusting arm 64 in its most rearward position.
Figure 5:
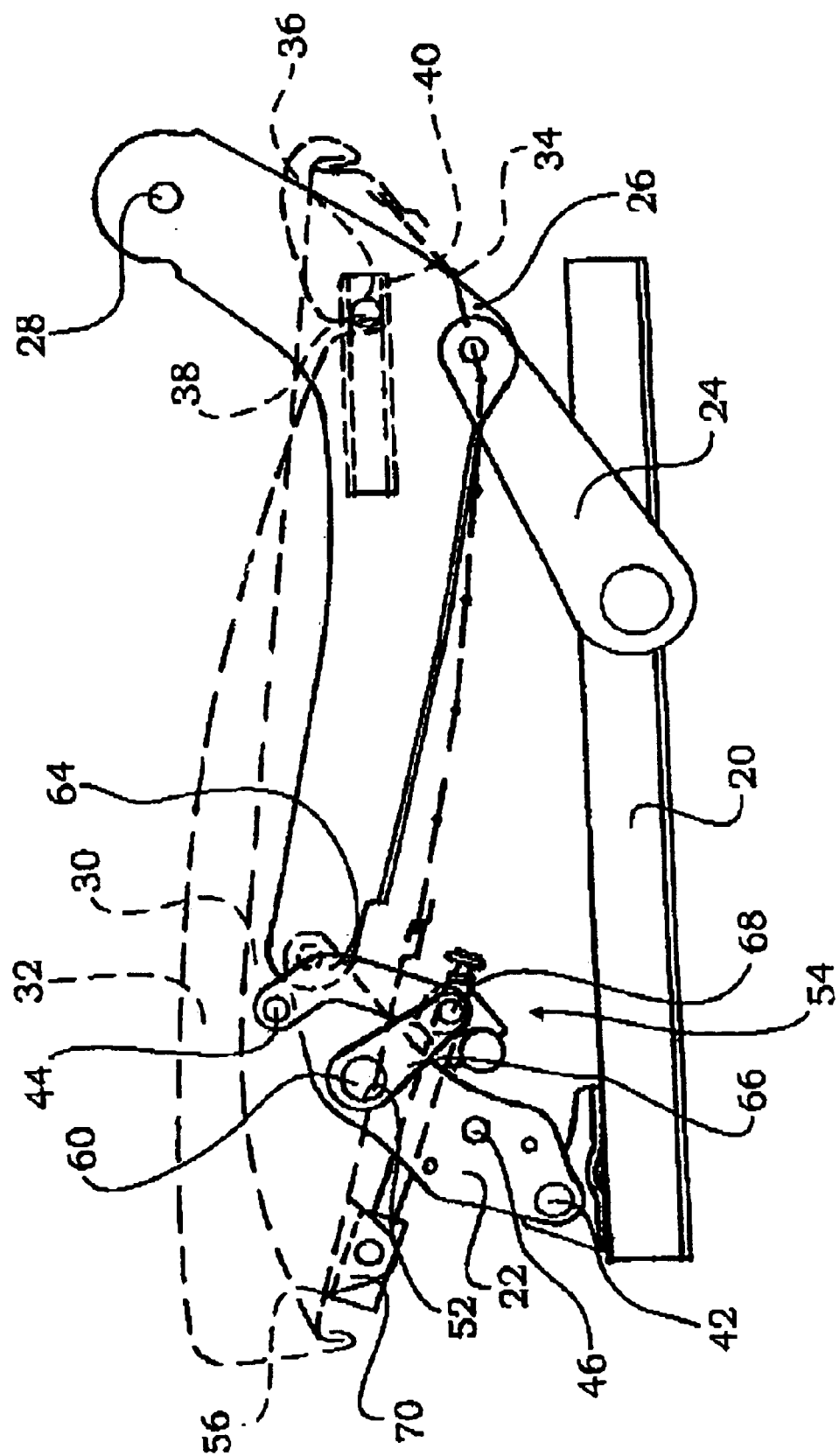
FIG. 5 is a side view of the frame of FIG. 1 showing the driver arm 66 in its lowest position and the adjusting arm 64 in its most forward position.

A bearing hole 46 of one of the two oscillating cranks carries an axle journal of a pinion 48 which is located between the oscillating cranks 22, 23 and is connected through a gearing to an electric motor 50 that forms the actuator for the reclining adjustment to be described. The electric motor 50 is also directly disposed on the oscillating crank 22 via its gearing. Accordingly, said oscillating crank is conveniently used to simultaneously act as a carrier for the actual driving elements. FIG. 2 shows connecting means, two nuts for example. In each oscillating crank 22, 23, holes are provided for these connecting elements as well.

Further, each oscillating crank has a receiving hole 52 for a pivot unit 54, also termed a pivoting bridge, which will be discussed in greater detail herein after. The receiving hole 52 is not located on the line that has been mentioned and that joins the two joints 42, 44 but opposite said joining line, offset to the front toward a front edge 56 of the padding support 30. In other words, the two joints 42, 44 and the receiving hole 52 are located on the apexes of a triangle which has, at the site of the receiving hole 52, a very large angle ranging from about 130 to 160 degrees. The receiving hole 52 is offset about 1 to 7, preferably 3 to 5 cm, to the front relative to the line joining the joints 42, 44.

Further, the receiving hole 52 is located somewhat nearer to the upper joint 44 than to the lower joint. The ratio ranges from 0.55 to 0.65.

The pivot unit 54 has a rod-shaped connecting part 58 that is realized by a tube. With its ends, it engages the receiving hole 52 in which it is carried and fixed in such a manner that it is allowed to rotate only. To have it freely pivot to an angle of about 30 degrees will suffice. The means for fastening said connecting part 58 in the two oscillating cranks 22, 23, more specifically for fixing them axially, are not shown, but these means are well known in the art. Spring washers, clamping rings, nuts, pins and the like can for example be used.

The connecting part 58 is cranked, it is parallely offset to the back and to the top over the major portion of its overall length. The connecting part 58 and, as a result thereof, the entire pivot unit, are disposed so as to be pivotal about an axial line 60 relative to the pair of oscillating cranks.

In immediate proximity to one oscillating crank 22 and on the inner side of said oscillating crank there is provided a sector gear 62 which is part of the pivot unit 54, is centered on the axial line 60 and is rigidly connected to the connecting part 58. The sector gear 62 too is a flat sheet metal part, more specifically a stamped or an embossed part. A driver arm 66, which is configured integral therewith, extends away therefrom toward the back, approximately at right angles to the sector gear 62. The bearing hole 46 of the pinion is located approximately on a line joining the two joints 42, 44 and is considerably nearer to the lower joint 42 than to the upper joint, the ratio approximately being of one third to two thirds.

An adjusting arm 64 is hinged to the driver arm of the sector gear 62. On the other end of the rod-shaped connecting part 58, a discrete driver arm 66, which is oriented parallel thereto, is rigidly connected to the connecting part 58, an adjusting arm 64 built according to the same principle is also provided thereon. Accordingly, an adjusting arm 64 is located on either seat side. The adjusting arms are located in immediate proximity to the oscillating cranks 22, 23.

The adjusting arms 64 are slightly bent and extend substantially upward. In proximity to their upper end region, they are hinged to the padding support 30 in one hinge point 68 each. This occurs above the seat carrier 26. As a result thereof, it is possible to position the seat carrier 26 between the adjusting arms 64.

It is also possible to dispose the discrete driver arm 66 outside of the associated oscillating cranks, the same may be done on the other seat side, a discrete driver arm 66 having to be provided there as well in this case.

The sector gear 62 is pivoted upon actuation of the electric motor 50, with its driver arm it drags the adjusting arm 64 along, the height of the front edge of the padding support 30 being adjusted as a result thereof. The pivot angle of the driver arms 66 is depicted in FIG. 1.

In the front region of the padding support 30 and in the center thereof, a driver 70 projects downward. Further, in the center region of the connecting part 58, a bearing part 72 is placed, said bearing part carrying a nut 74 which, as a result of this bearing arrangement, is pivotal about an axis parallel to the axial line 60. A spindle 76 extends through said nut. The spindle is driven by a second electric motor 78. Said second electric motor is located in immediate proximity to the first electric motor 50 together with which it can be locked. A reversing gear is provided. Due to the high gear reduction ratio provided by a spindle drive consisting of nut 74 and spindle 76, a low gear reduction ratio is at the most required between the second electric motor 78 and the spindle 76, the reversing gear in any case reversing 90 degrees the direction of rotation of the second electric motor 78 and providing the possibility to dispose the second electric motor 78 somewhat underneath the spindle 76. A threaded axle journal 80, with a nut screwed thereon, is connected to the reversing gear, it projects parallel to the axial line 60. Said axle journal 80 is introduced into a hole of the driver 70 and the connection is secured through the nut.

Accordingly, the thus described linear actuator 71 acts between the driver 70 and the bearing part 72. In the side view of FIG. 1, with the sector gear 62 in the middle position, the hinge connection between the driver arm 66 and the adjusting arm 64 is in the same position as the axial line of the spindle 76. Further, the axial line 60 substantially intersects the spindle 76. As a result thereof, the seat depth adjustment and the reclining adjustment are adjustable substantially independent of one another.

Upon actuation of the second electric motor 78, the padding support 30 travels in the direction of the spindle 76 toward the front or toward the back. The padding support 30 is thereby displaced relative to the seat carrier 26. In the rear region, this leads to an adjustment of the guide means 36.

What is claimed is:

1. A frame of a motor vehicle seat comprising;
   a longitudinal guide;
   a seat carrier;
   a front pair of oscillating cranks disposed between the longitudinal guide and the seat carrier;
   a padding support for a seat padding;
   a pinion rotatably disposed on one of the oscillating cranks of the pair of oscillating cranks;
   an actuator associated with said pinion;
   a pivot unit disposed between the two oscillating cranks, rotationally linked to said two oscillating cranks and pivotal about an axial line, said pivot unit being provided with a sector gear that is centered on the axial line and meshes with the pinion; and
   an adjusting arm disposed between the pivot unit and the padding support so that the height of a front edge of the padding support is adjustable by adjusting the sector gear.

2. The frame of a motor vehicle seat according to claim 1, wherein the oscillating crank is hinge-linked to the longitudinal guide in a lower joint and to the seat carrier in an upper joint and wherein the axial line is located substantially between the lower and the upper joint, nearer to the upper joint than to the lower joint.

3. The frame of a motor vehicle seat according to claim 1, wherein the oscillating crank is hinge-linked to the longitudinal guide in a lower joint and to the seat carrier in an upper joint and wherein the axial line is offset toward the front edge of the padding support relative to a line joining the lower joint with the upper joint.

4. The frame of a motor vehicle seat according to claim 1, wherein the pivot unit is provided with a rod-shaped connected part being cranked relative to the axial line, away from the front edge of the padding support, with the pinion being in the middle position on the sector gear.

5. The frame of a motor vehicle seat according to claim 1, wherein the pivot unit comprises a rod-shaped connecting part, wherein a driver is disposed on the padding support in proximity to the front edge thereof and wherein a linear actuator is provided between the rod-shaped connecting part and the driver, the padding support being displaced relative to the seat carrier upon actuation of said linear actuator.

6. The frame of a motor vehicle seat according to claim 5, wherein the actuator disposed approximately in the center between the two oscillating cranks.

7. The frame of a motor vehicle seat according to claim 5, wherein the actuator is provided with a motor-driven spindle and with a nut surrounded by said spindle.

8. The frame of a motor vehicle seat according to claim 7, wherein the nut is rotationally connected to the pivot unit.

9. The frame of a motor vehicle seat according to claim 1, wherein a guide means is provided between a rear region of the padding support and a rear region of the seat carrier, said guide means allowing the padding support to be displaced longitudinally relative to the seat carrier and substantially parallel to the longitudinal guide and, in addition thereto, the padding support to be pivoted relative to the seat carrier about a rear pivot line which is oriented parallel to the axial line.

10. The frame of a motor vehicle seat according to claim 1, wherein the axial line is located nearer to the upper joint than to the lower joint.

11. The frame of a motor vehicle seat according to claim 1, wherein the axial line is spiced from the lower joint a distance approximately 1.5 to 2 times greater than the distance separating the axial line from the upper joint.

12. The frame of a motor vehicle seat according to claim 1, wherein the oscillating crank is hinge-linked to the longitudinal guide in a lower joint and to the seat carrier in an upper joint and wherein the axial line is offset a distance from 1 to 5 cm toward the front edge of the padding support relative to a line joining the lower joint with the upper joint.

13. The frame of a motor vehicle seat according to claim 1, wherein the pivot unit comprises a rod-shaped connecting part that is cranked backward, away from the front edge of the padding support, with the pinion being in the middle position on the sector gear.

* * * * *